Dec. 3, 1968

R. F. ROBERSON 3,413,941

PLANTER METERING DEVICE

Filed Oct. 20, 1966

INVENTOR
RAYMOND F. ROBERSON
J K McNeill
ATTY

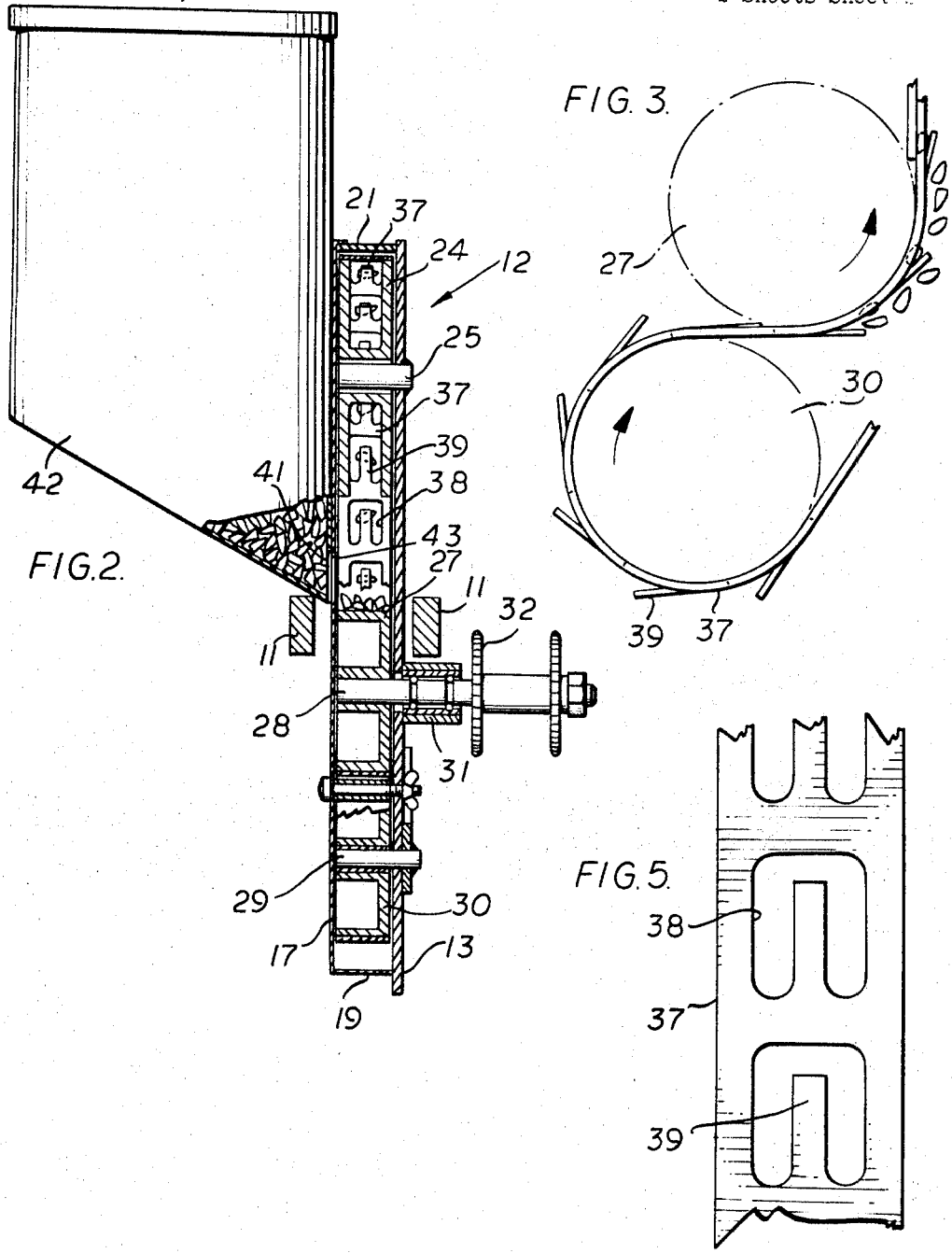

3,413,941
PLANTER METERING DEVICE

Raymond F. Roberson, Los Angeles, Calif., assignor to International Harvester Company, Chicago, Ill., a corporation of Delaware
Filed Oct. 20, 1966, Ser. No. 588,187
6 Claims. (Cl. 111—77)

This invention relates to planters and particularly to novel seed selecting and metering mechanism therefor.

Conventional planters of seed such as corn utilize seed plates each of which has cells of a selected size, requiring that the seed be graded, and an object of this invention is the provision of improved seed metering mechanism for a planter.

Another object of the invention is the provision of improved planting apparatus having novel means for effecting the precise and rapid metering of seed irrespective of variations in the side and shape thereof.

Another object of the invention is the provision of novel metering mechanism for planting ungraded seed wherein an endless belt having openings therein cut out to form tangs or spring fingers extending over the opening is driven in contact with the seed and over a pulley which causes the spring fingers to project outwardly and to close upon a seed when the belt leaves the pulley, a retainer being provided to hold the seed in the opening until the belt passes a discharge outlet.

Other objects and advantages of the invention will become clear from the following detailed description when read in conjunction with the accompanying drawings wherein:

FIGURE 2 is a sectional view taken on the line 2—2 of FIGURE 1;

FIGURE 3 is an enlarged detail of a portion of the metering apparatus shown in FIGURE 1;

FIGURE 5 is a plan view of the structure shown in FIGURE 4.

Figure 1:
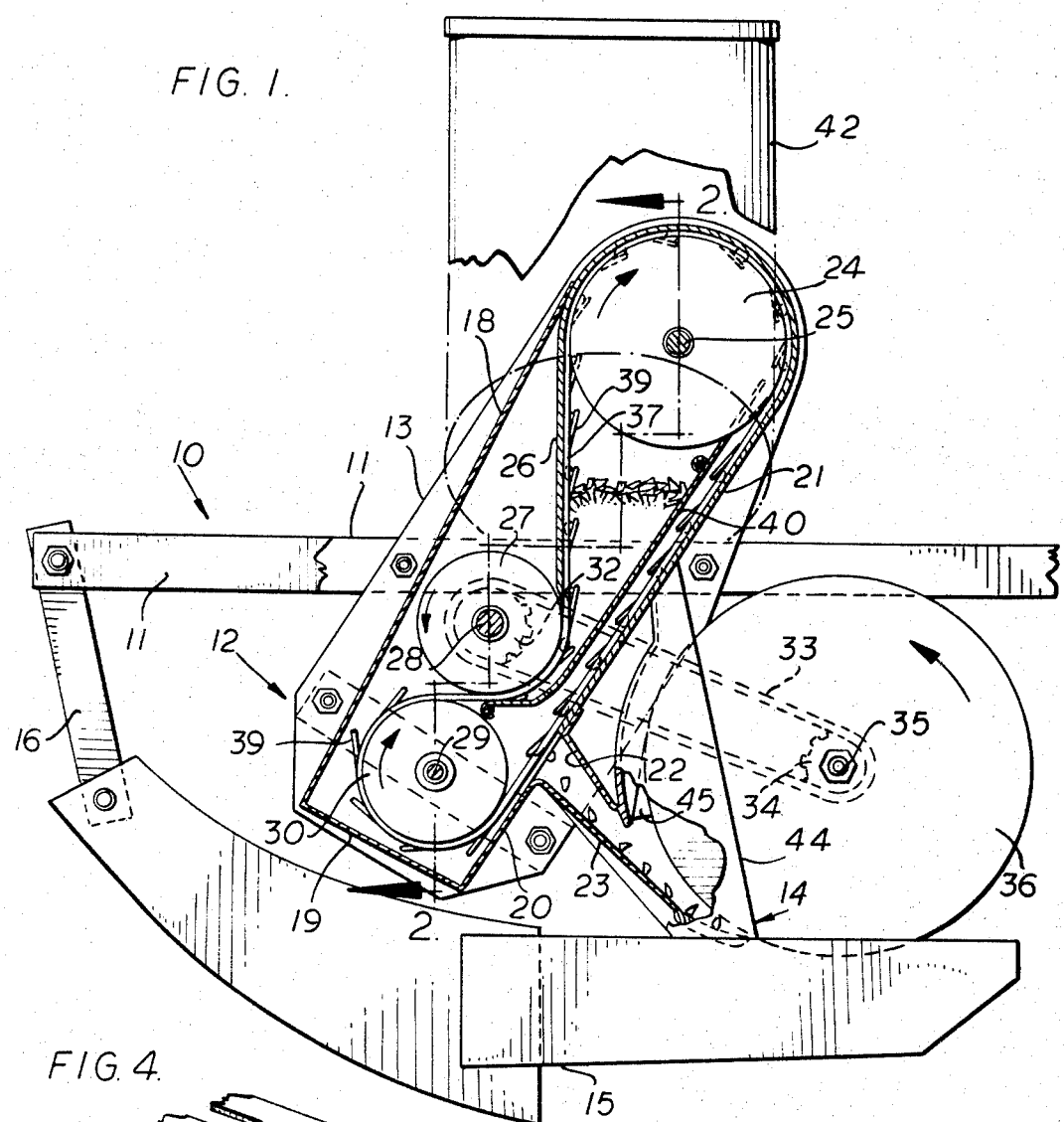
FIGURE 1 is a sectional view in side elevation of a portion of a planter utilizing metering mechanism incorporating the features of this invention.
Figure 4:
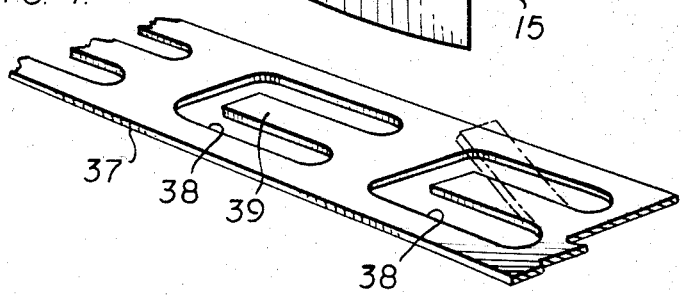
FIGURE 4 is an enlarged detail in perspective of a portion of the endless belt of this invention.

In the drawings the numeral 10 designates the conventional frame of a planter unit having laterally spaced rails 11 upon which is mounted a generally rectangular housing 12 including a base plate 13, and a bracket 14 having a furrow opener 15 secured to its lower end, the forward end of the furrow opener being connected by a link 16 to the side rails 11.

Housing 12 also includes a plate 17 spaced from plate 13 and connected thereto by side and end walls 18 and 19, respectively, and a lower side wall portion 20 spaced from an upper continuing side wall 21 to form a discharge port or outlet 22 communicating with a guide tube 23 forming part of bracket 14. The upper end of wall portion 21 is bent concentrically with and disposed adjacent the periphery of a pulley 24 mounted in the housing on a shaft 25, the end portion 26 of wall member 21 being connected to the upper end of wall 18 and extending diagonally inwardly as indicated in FIGURE 1.

The end portion 26 terminates adjacent the periphery of a pulley or wheel 27 mounted on a shaft 28 carried by the housing 12. Another shaft 29 is mounted in the lower end of housing 12 and carries a pulley 30, the axis of pulley 27 being radially offset somewhat from a line between shafts 25 and 29.

Shaft 28 is mounted in a bearing 31 carried by the frame 10 and has secured thereto a sprocket wheel 32 connected by a drive chain 33 with another sprocket wheel 34 mounted on a shaft 35 supported in any suitable manner, not shown, from the frame 10 and having mounted thereon a wheel 36, performing a function hereinafter described. The planter shown in the drawings is preferably of the ground drive type wherein drive is transmitted to sprocket wheel 34 by suitable means from a ground engaging wheel, not shown, supported from frame 10.

Pulley 27 is driven in the direction of the arrow shown in FIGURE 1 and peripherally engages an endless belt 37 preferably of spring steel having U-shaped openings or cut-outs 38 forming tangs or spring fingers 39.

Belt 37 is trained over pulleys 24 and 30 which engage the inner face of the belt and revolve in a clockwise direction as viewed in FIGURE 1, as opposed to the counterclockwise direction of rotation of pulley 27 which engages the outer face of the belt.

The diagonally inwardly directed section 26 of housing side 21 converges with respect to a baffle 40 mounted in housing 12 to form a triangularly shaped receptacle for seed fed through an opening 41 in the wall of a slanted bottom seed hopper 42 affixed to the wall 17 of housing 12, opening 41 communicating with an opening 43 in wall 17 to direct seed into the housing.

Spring fingers 39 are biased into the plane of belt 37 but deflect outwardly in a direction opposite to the curvature of the pulley about which the belt is trained, as clearly shown in FIGURES 1 and 3. As the spring fingers 39 pass over the periphery of pulley 27 and into the triangular receptacle formed by wall sections 26 and baffle 40 the opening of the spring fingers allows a seed to be trapped in the opening 38 under spring finger 39, and as the belt 37 moves in a straight line along wall section 26, the latter functions as a retainer, the inward bias of fingers 39 pinching the seed therebetween and the retainer wall.

As shown in FIGURE 1, seed held by each finger 39 is carried around the periphery of pulley 24 retained by the curved section of wall 21, and again travels in a straight line along the lower portion of wall 21 in the clear space therebetween and baffle 40, until it passes over discharge outlet 22 where the seed is ejected and falls into guide tube 23.

It may be understood that the wheel 36 forms no part of the invention claimed herein but a portion thereof revolves in a protective trough 44 formed in bracket 14 and is provided with one or more lugs 45 adapted to engage seed in the lower part of tube 23 and inject them into the furrow formed by the furrow opener 15, the lower wall of tube 23 terminating in a seed stop yieldable to discharge the seed.

It is believed that the construction and operation of the novel seed metering mechanism of this invention will be clearly understood from the foregoing description.

What is claimed is:

1. In a planter having a frame and a furrow opener carried thereby, a seed hopper mounted on the frame having an opening for the passage of seed therefrom and seed selecting and metering mechanism disposed between the hopper and the furrow opener for receiving seed from the hopper and discharging it to the furrow opener comprising, a housing mounted on the frame in communication with said outlet to receive seed from the hopper, spaced pulleys mounted in said housing, and an endless conveyor belt trained on said pulleys, said belt having cut-outs forming spring fingers normally disposed and biased in the plane of the belt when the latter follows a straight path between said pulleys and deflectable radially outwardly as the inner face of said belt engages and follows a curved path over one of said pulleys to form a pocket between each of said fingers and the periphery of said one of said pulleys, and retainer means mounted in said housing in substantial engagement with said inner face of said belt upon departure of the latter from said one of said pulleys to hold seed therebetween and said fingers.

2. The invention set forth in claim 1, wherein said housing is provided with a discharge outlet for delivering seed to said furrow opener and said retainer terminates adjacent said outlet to discharge the seed held between each of said fingers and said retainer.

3. The invention set forth in claim 2 wherein a portion of said retainer is concentric with another of said pulleys and said belt follows a path between the periphery of said other pulley and said retainer.

4. The invention set forth in claim 3, wherein a baffle is mounted in said housing forming with said belt a triangularly shaped reservoir for seed to be engaged by said fingers.

5. The invention set forth in claim 4, wherein said retainer forms a portion of the wall of said housing adjacent said outlet.

6. The invention set forth in claim 5, wherein a third pulley is mounted in said housing between said previously mentioned pulleys and in engagement with the outer face of said belt.

References Cited
UNITED STATES PATENTS

| | | | |
|---|---|---|---|
| 2,141,044 | 12/1938 | Rassman | 111—34 |
| 3,122,283 | 2/1964 | Walters | 111—34 X |
| 3,343,507 | 9/1967 | Smith | 111—73 |

ABRAHAM G. STONE, *Primary Examiner.*

R. C. HARRINGTON, *Assistant Examiner.*